Aug. 15, 1950

J. G. VINCENT 2,518,841

PROPELLER DRIVE FOR AIRPLANES WITH
COUNTER-ROTATING PROPELLERS
Filed Dec. 15, 1945

Inventor
Jesse G. Vincent

By Tibbetts & Hart

Attorneys

Patented Aug. 15, 1950

2,518,841

UNITED STATES PATENT OFFICE 2,518,841

PROPELLER DRIVE FOR AIRPLANES WITH COUNTER-ROTATING PROPELLERS

Jesse G. Vincent, Grosse Pointe Park, Mich., assignor to Packard Motor Car Company, Detroit, Mich., a corporation of Michigan Application December 15, 1945, Serial No. 635,271

4 Claims. (Cl. 244—60)

This invention relates to airplanes and particularly to airplanes of the so-called pusher type, that is, an airplane in which the propellers are mounted at the rear and tend to push the plane forwardly.

Also, the invention is concerned with the use of coaxial propellers which are superior to the twin or dual propeller arrangement particularly because with the latter, in event of one engine stopping, a considerable yaw occurs making it necessary to use heavy rudder to keep the airplane going straight ahead. It is estimated that because of this rudder action the present twin propeller airplanes have only about 40% of full power when one engine is stopped. With the coaxial propellers however, there is approximately 49% of full take-off power available with one engine dead.

It is of importance that all engines of an airplane should be interchangeable which they cannot be when one turns clockwise and the other counter-clockwise. In the latter case a much larger number of spares must be provided at the various service stations and flying fields.

There is also an advantage in arranging the propellers at the rear of the plane because this does not require independent nacelles for the engine as is required with the arrangement of the dual propellers in the wings.

It is an object of the present invention to provide an airplane with coaxial propellers turning in opposite directions and driven by interchangeable engines turning in the same direction.

Another object of the invention is to provide an airplane of the pusher type with coaxial propellers turning in opposite directions and driven without idler gearing from engines turning in the same direction and mounted at the forward end of the plane where they are accessible for inspection and replacement.

Another object of the invention is to provide an airplane with coaxial propellers driven by engines to which the propellers are respectively connected and all of the connections of which from each engine to its respective propeller are mounted independently of the connections of the other, so that failure of either engine, its propeller or connections will in no way affect the operation of the other engine, its propeller and connections.

Other objects of the invention will appear from the following description taken in connection with the drawing, which forms a part of this specification, and in which.

Figure 1:
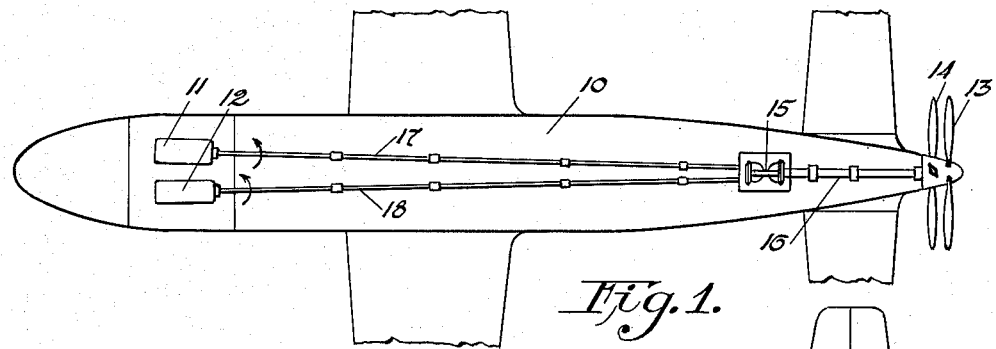
Fig. 1 represents a somewhat diagrammatic view of an airplane embodying the invention.
Figure 2:
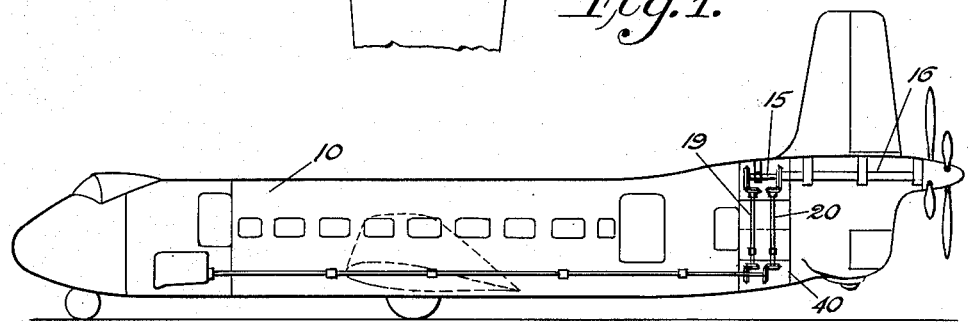
Fig. 2 is a side view of the airplane shown in Fig. 1.

Referring to the drawings, 10 indicates the fuselage of an airplane of the pusher type in which the power plant is arranged at or adjacent the front end and the propellers at the rear. As shown, there are two engines 11 and 12 arranged side by side which engines are identical particularly in that they turn in the same direction. These engines are arranged in a suitable compartment where they are accessible for service or replacement.

At the rear of the plane are the two coaxial propellers 13 and 14 and their shafts 15 and 16, the propellers and shafts being mounted in the plane somewhat above the horizontal plane of the engines so that the propellers may clear the ground at take-off.

Between the engines and the propeller shafts is the transmission which accomplishes two very important results: first, it is so arranged that the two engines rotating in the same direction will drive the propellers in opposite directions without the use of idler gears, and second, the transmission mechanism from each engine to its respective propeller is entirely self-contained and independent of the other transmission mechanism so that in event one of the engines or any part of its transmission mechanism is disabled, the other transmission mechanism and propeller may continue to operate at full power.

This mechanism comprises horizontal shafts 17 and 18 and vertical shafts 19 and 20 with a pair of bevel gears 21 directly connecting shafts 17 and 19 and a pair of bevel gears 22 directly connecting shafts 18 and 20. The upper ends of the shafts 19 and 20 are directly connected to the propeller shafts 15 and 16, meshing bevel gears 23 connecting shaft 19 to propeller shaft 15 and meshing bevel gears 24 connecting shaft 20 to propeller shaft 16.

In order that the vertical shafts 19 and 20 may be directly geared to the propeller shafts, there is a convergence of the transmission mechanism from the engines to the propeller shafts. This convergence may take place either in the horizontal shafts 17, 18, or the vertical shafts 19, 20, or both. As shown, the shafts 17, 18 converge slightly from the engine to the gears 21, 22, and the vertical shafts 19, 20 converge as they extend upwardly from the lower gears to the upper gears and thus the extended axes of the vertical shafts intersect the common axis of the propeller shafts and consequently may be directly geared thereto by the bevel gears.

That part of the transmission mechanism between the rear ends of the shafts 17, 18 and the forward ends of the shafts 15, 16 is housed in a casing 25 shown in all of the figures of the drawings. It is cut away or illustrated in phantom form to show the gearing and shafts. This casing forms the principal support for the mechanism which extends into or is within it and it provides for independent support of the respective transmission mechanisms. Thus, the rear end of the shaft 17 has a bearing 27 and the rear end of the shaft 18 has a bearing 28, in the casing 25. The vertical shaft 19 has bearings 29 and the shaft 20 has bearings 30. Also, the shaft 15 has a bearing 31 and shaft 16 has a bearing 32, in the casing 25. There is also bearing 33 for the rear end of the shaft 15 and a bearing 34 for the rear end of shaft 16, these latter two bearings being in a suitable part of the plane such as that part which supports the propellers themselves.

Thus the entire transmission mechanism for both of the propellers from their respective engines to the propellers themselves is a divided transmission, each part being independent of the other.

The casing 25 is formed with a sump 40 in which are two pumps, a pump 41 driven from the shaft 17 and a pump 42 driven from the shaft 18. These pumps draw oil from the bottom of the casing 25 and deliver it through the respective pipes 43 and 44 to the gears 23, 24 at the upper end of the casing. These pumps also are independent of each other, and disabling of one of them will not affect the operation of the other.

Casing 25 may have a partition 45 dividing the casing into two separate compartments so that the lubrication circulation of each may be entirely independent.

Figure 4:
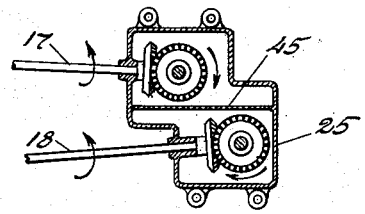
Fig. 4 is a horizontal sectional view through the transmission casing.
Figure 3:
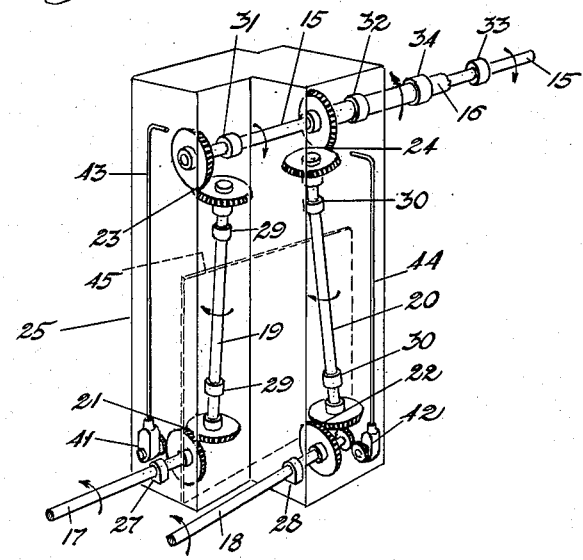
Fig. 3 is a perspective view of the shafts and gearing with a phantom view of the casing.

In Figs. 1, 3 and 4, the direction of the respective shafts is indicated by suitable arrows showing the same rotation of the two engines and the opposite rotation of the propellers, all without intervening idler gears, and all with entirely independent transmission mechanism.

It will be understood that various forms of the invention other than that described above may be used without departing from the spirit or scope of the invention.

What is claimed is:

1. In an airplane, the combination of two engines of same rotation arranged side-by-side adjacent one end of the plane, two coaxial propellers and their shafts mounted adjacent the other end of the plane, and transmission mechanism between said engines and the shafts of said propellers comprising shafts extending from the engines longitudinally of the plane and shafts extending in a generally vertical direction from said longitudinal shafts to the propeller shafts, the shafts of said transmission mechanism converging at some point between the engines and the propeller shafts, and direct gearing at the lower and upper ends of the vertically arranged shafts providing a drive for the propeller shafts in opposite directions.

2. In an airplane of the pusher type, the combination of two propellers and their shafts mounted coaxially and independently at the rear of the plane, two engines of same rotation mounted side-by-side adjacent the front end of the plane, a transmission casing adjacent the rear of the plane, said propeller shafts extending into the upper part of said casing and in part at least supported thereby, horizontal drive shafts extending from said engines into the lower part of said casing, vertically extending shafts in said casing, gearing between the drive shafts and the respective vertical shafts, and gearing between the respective vertical shafts and propeller shafts, the gearing being such that the propeller shafts are driven in opposite directions.

3. In an airplane of the pusher type, the combination of two propellers and their shafts mounted coaxially and independently at the rear of the plane, two engines of same rotation mounted side-by-side adjacent the front end of the plane, a transmission casing adjacent the rear of the plane, said propeller shafts extending into the upper part of said casing and in part at least supported thereby, horizontal drive shafts extending from said engines into the lower part of said casing, vertically extending shaft in said casing, gearing between the drive shafts and the respective vertical shafts, and gearing between the respective vertical shafts and propeller shafts, the gearing being such that the propeller shafts are driven in opposite directions, the shafts between the engines and the propeller shafts converging at some point so that the extended axes of the vertical shafts will intersect the common axis of the propeller shafts.

4. In an airplane of the pusher type, the combination of two propellers and their shafts mounted coaxially and independently at the rear of the plane, two engines of same rotation mounted side-by-side adjacent the front end of the plane, a transmission casing adjacent the rear of the plane, said propeller shafts extending into the upper part of said casing and in part at least supported thereby, horizontal drive shafts extending from said engines into the lower part of said casing, vertically extending shafts in said casing, gearing between the drive shafts and the respective vertical shafts, and gearing between the respective vertical shafts and propeller shafts, the gearing being such that the propeller shafts are driven in opposite directions, the shafts between the engines and the propeller shafts converging at some point so that the vertical shafts may be geared directly to the respective coaxial propeller shafts.

JESSE G. VINCENT.

REFERENCES CITED

The following references are of record in the file of this patent:

UNITED STATES PATENTS

| Number | Name | Date |
|---|---|---|
| 2,136,128 | Gerin | Nov. 8, 1938 |
| 2,359,652 | Larsen | Oct. 3, 1944 |

FOREIGN PATENTS

| Number | Country | Date |
|---|---|---|
| 99,903 | Switzerland | July 16, 1923 |

OTHER REFERENCES

Aviation News of Sept. 17, 1945, page 12.
"Aviation," Feb. 1947, pages 37–42.